2,895,856
Patented July 21, 1959

2,895,856
METHOD OF PICKLING CHROMIUM-CONTAINING STEEL TUBES

Tonny Hong, North Sewickley Township, Beaver County, Pa., assignor to United States Steel Corporation, a corporation of New Jersey No Drawing. Application December 15, 1955
Serial No. 553,212

2 Claims. (Cl. 134—3)

This invention relates to an improved method of removing scale from chromium-containing steel and more particularly from chromium-containing steel tubes following open annealing thereof.

Full annealing of many chromium steels containing chromium in excess of 1% requires holding for long periods at high temperatures. Since holding times in excess of twelve hours are commonly used, a heavy, adherent coat of complex scale is formed thereon which is difficult to remove by acid pickling. Four to seven hours pickling time in sulphuric or hydrochloric acid solutions is required for complete removal of this scale in comparison to thirty minutes or less for pickling ordinary low carbon steel. In addition to the expense involved in tying up pickle tubs for such long periods of time, there is the further disadvantage that the tubes often become pitted on a portion of their surface because the scale is not uniform and parts of the tube become over pickled before the scale is removed from other parts. Shot blasting has been used to some extent as a substitute for pickling. While it is satisfactory for the outside surface of a tube, it is unsuitable for the inside.

It is accordingly an object of my invention to provide a method of removing scale from chromium-containing steels in an expeditious and economical manner.

It is a further object of this invention to provide a method of removing scale from chromium-containing steel tubes which effectively removes the scale from the interior as well as the exterior thereof without pitting.

In accordance with the teachings of my invention, chromium-containing steel tubes which have been fully annealed in an open furnace, i.e. the interior of which is exposed to the atmosphere, are annealed in a reducing atmosphere containing CO and $CO_2$ in at least a 2:1 ratio. In addition, the atmosphere should contain at least about 5% $H_2$ with the balance substantially nitrogen. A typical gas analysis is as follows:

| | |
|---|---|
| 5% | $CO_2$ |
| 10% | CO |
| 0% | $O_2$ |
| 10% | $H_2$ |
| Remainder | $N_2$ |

As an illustration of my improved method of scale removal, several lots of tubing formed of steel manufactured to the specification:

.15% max. carbon
.30–.60% manganese
8.00–10.00% chromium
.9–1.1% molybednum were fully annealed by heating in air to 1600° F. for one hour and slowly cooled for 14 hours to about 1100° F. According to previous practice such steel so treated would require at least four hours for scale removal by acid pickling.

These tubes were then heated between 1100° F. and 1650° F. and pickled with the results shown by the following Table I:

Table I

| Heating Temperature | Acid Pickle |
|---|---|
| 1,100° F | 1 hour. |
| 1,200° F | ¾ hour. |
| 1,300° F | 20-30 minutes. |
| 1,400° F | 30-45 minutes. |
| 1,650° F | 1-1½ hours. |

This shows that the heating should be between 1200° F. and 1400 F. and preferably at about 1300 F. One hour at the proper temperature is sufficient to achieve the objects of this invention. The tubes should be maintained in the protective atmosphere while cooling to approximately room temperature.

Typical analyses of scale following open annealing and heating in the reducing atmosphere, i.e. bright anneal, at the various temperatures are listed in the following Table II:

Table II

| Description | Carbon, Percent | Chromium, Percent | Molybdenum, Percent | Iron, Percent |
|---|---|---|---|---|
| Open anneal scale | .063 | 2.24 | | 68.52 |
| Bright anneal @ 1,100° F | .37 | 2.85 | | 68.53 |
| Bright anneal @ 1,300° F | .108 | 3.31 | .24 | |
| Bright anneal @ 1,400° F | .18 | 3.72 | | 73.66 |

This shows that by heating around 1300° F. the character or composition of the scale undergoes considerable change.

Following such annealing the tubes may be conveniently pickled in an aqueous, acid solution of sulphuric or hydrochloric acid containing between about 15 and 25% acid by weight and maintained at a temperature between 150 and 200° F. preferably about 180° F. As is shown by Tables I and III, pickling can be accomplished within a half hour after bright annealing at about 1300° F. In contradistinction to conventional pickling, the scale is removed from the inside surfaces as quickly as from the outside surfaces.

Table III

| Grade | Acid Pickling Time | |
|---|---|---|
| | Without Bright Anneal | With 1,300° F. Bright Anneal |
| 2¼% Cr.—1% Mo | 4 hours | ½ hour. |
| 5% Cr.—0.5% Mo | 4 hours | ½ hour. |
| SAE 410 | 4½ hours | ½ hour. |
| SAE 416 | Requires Shot Blast | 20 minutes. |
| AISI 52100 | 6-7 hours | 1 hour. |

While I have shown and described several specific embodiments of my invention, it will be understood that these embodiments are merely for the purpose of illustration and description and that various other forms may be devised within the scope of my invention, as defined in the appended claims.

I claim:
1. A method of removing scale from open-annealed chromium-containing steel comprising heating said steel to between 1100 and 1400° F. for at least one hour while in a reducing atmosphere containing at least about 5% carbon monoxide and at least about 10% carbon dioxide in a ratio of at least 2:1 and the balance substantially nitrogen and thereafter pickling said steel in an aqueous acid solution containing between 15 and 25% by weight of acid of the group consisting of sulphuric and hydrochloric acid maintained at a temperature between 150 and 200° F.

2. A method of removing scale from open-annealed chromium-containing steel tubes comprising heating said tubes to about 1300° F. for about one hour while in a reducing atmosphere containing about 5% hydrogen, 5% carbon dioxide, 10% carbon monoxide, the balance being substantially nitrogen, and thereafter pickling said tubes in an aqueous acid solution containing between 15 and 25% by weight of acid of the group consisting of sulphuric and hydrochloric acid maintained at a temperature of about 180° F.

References Cited in the file of this patent

UNITED STATES PATENTS

| | | |
|---|---|---|
| 2,347,527 | Vanderbilt | Apr. 25, 1944 |
| 2,389,838 | Bromberg | Nov. 27, 1945 |
| 2,472,786 | Bowerman | June 14, 1949 |
| 2,557,379 | Hancock | June 19, 1951 |
| 2,569,158 | Francis | Sept. 25, 1951 |
| 2,703,298 | Branson | Mar. 1, 1955 |